United States Patent Office 3,481,706
Patented Dec. 2, 1969

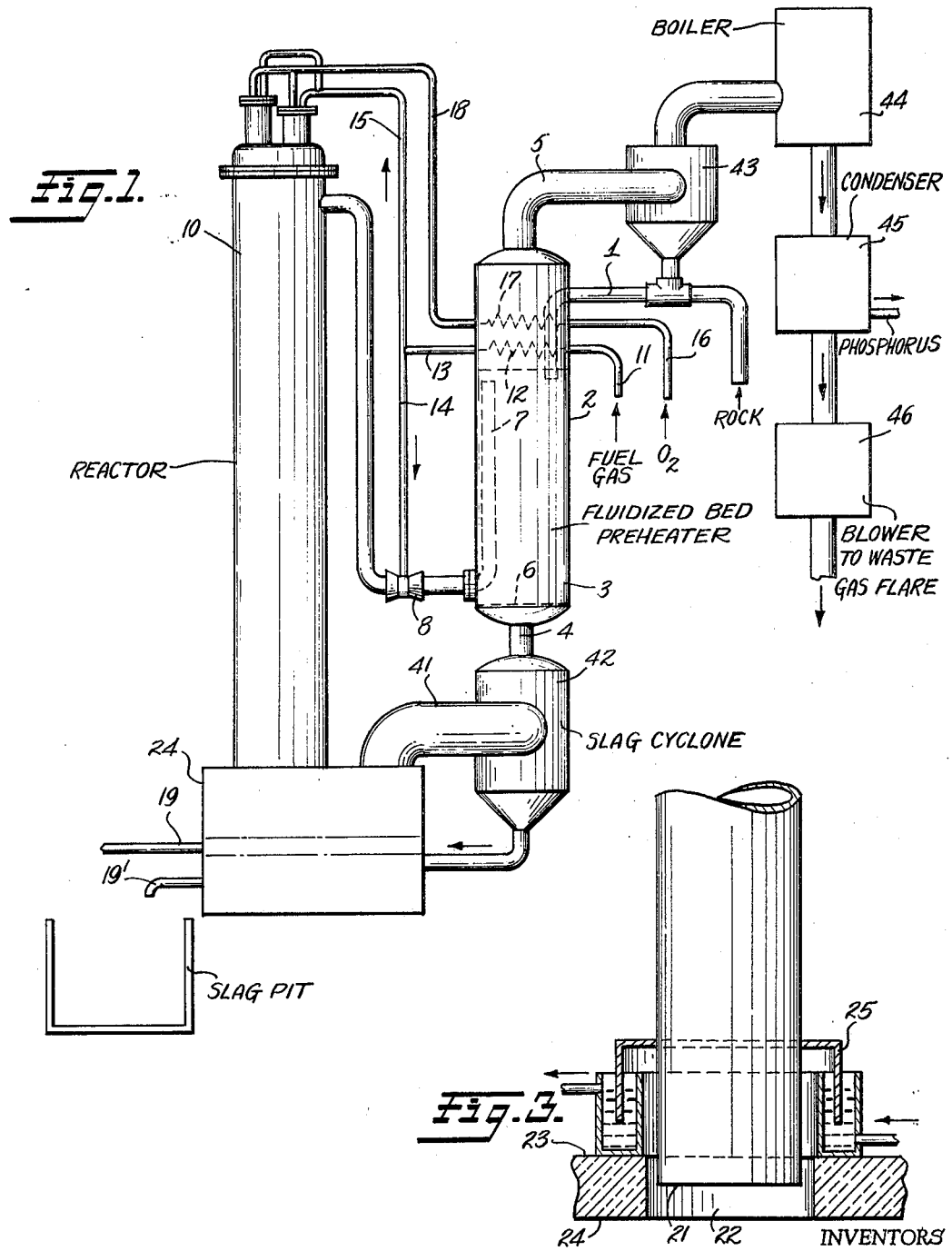

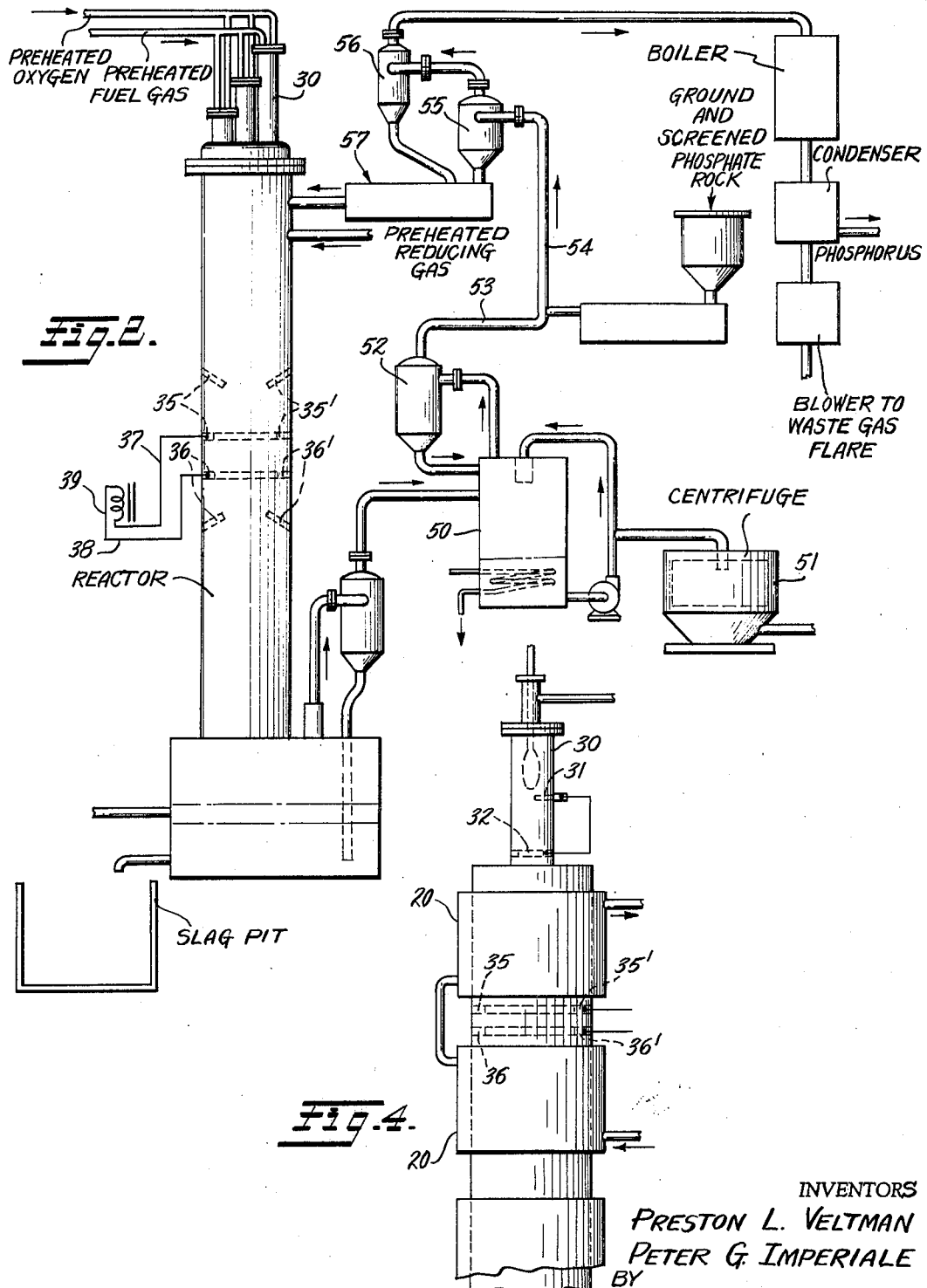

3,481,706
PHOSPHORUS PRODUCTION
Preston L. Veltman, Severna Park, Md., and Peter G. Imperiale, Brooklyn, N.Y., assignors to W. R. Grace & Co., New York, N.Y., a corporation of Connecticut
Filed Dec. 28, 1967, Ser. No. 694,318
Int. Cl. C01b 25/02
U.S. Cl. 23—223    6 Claims

ABSTRACT OF THE DISCLOSURE

A process and apparatus for producing phosphorus or oxides thereof from phosphatic ores by reduction in a flame. Phosphate rock or like ores, are converted into phosphorus by contacting the phosphatic ores, mixed with a reducing gas, in a reducing flame at the top of a vertical reactor. The products of combustion are allowed to fall freely through the reactor, which may contain additional heating means to insure complete combustion of the reactants. Molten slag droplets are collected at the bottom of the reactor and the gaseous products are withdrawn therefrom for further processing and to recover the elemental phosphorus. The hot gaseous products may be used to preheat the phosphatic ores and reducing gases charged to the top of the reactor.

---

This invention relates to a process and apparatus for producing phosphorus and/or phosphorus oxides and, more particularly, to a process and apparatus for producing phosphorus from phosphate rock and like ores by flame reduction.

There are presently a number of known and available methods and apparatus for producing phosphorus and phosphorus oxides from phosphate rock and like ores. Of the known methods, the most important commercially is the electric furnace process wherein elemental phosphorus is produced by the reduction of phosphate rock with coke in the presence of silica. The coke serves both as a reactant and for conducting electricity through the bed in the furnace. Heating is carried out by passing an electric current introduced into the bed by means of conductive electrodes. The ore comprising mass is heated and the volatile phosphorus produced in the reduction reaction is recovered overhead. The phosphorus is separated from the gaseous products, i.e., carbon monoxide and water vapor, by condensation.

Further known methods for producing phosphorus include the blast furnace process and fluidized bed processes. In the former, a charge of carbon as coke, phosphate rock and silica is heated in a blast furnace to produce molten slag and hot producer gas containing elemental phosphorus. The hot producer gases are recovered overhead and the phosphorus is recovered by condensaiton, etc. In the fluidized bed technique, the reduction of the phosphatic material takes place in a fluidized bed which consists of a fluent mixture of finely divided phosphatic and carbonaceous material. The phosphorous is recovered from the resulting gases. The fluidized bed may be heated by hot gases or by passing an electric current through the fluidized particles by conductive electrodes immersed in the fluidized bed.

Though many such above discussed methods have been proposed and in the case of the electric furnace process gained commercial acceptance, none have proved entirely satisfactory. In the case of the electric furnace process, an excess of coke must be employed in order to supply the electrical conductivity required for resistance heating of the charge. Further, the use of the electric furnace requires a large capital expenditure as well as high operating costs due to the large electric power input required.

Also, the presence of fines in the feed charge causes erratic operation of the furnace. In fluidized bed processes, excessive volumes of heated gas are required to provide the heat requirement necessary to volatilize the phosphorus. If conductive electrodes are employed in the bed, an excess of coke, as in the electric furnace process, must be provided to have sufficient electrical conductivity to heat the bed. Further, at the temperatures required to evolve the phosphorus, the excess coke sticks to the soft ore particles resulting in a fused slag. In any fluidized bed process, where fusible materials are involved, sticking or particle agglomeration is a problem. This problem is particularly acute in producing phosphorus because of the fusible nature of the phosphate rock.

In general, the blast furnace process for producing phosphorus, which has been found to be impractical commerically, suffered from several disadvantages, including at times, low overall efficiency, low phosphorus yields, excessive amounts of hot gases evolved, etc. Presently no phosphorus is being commercially produced by this process.

In summary, the present invention provides a highly efficient, economical process for producing phosphorus from phosphatic ores by reduction in a flame. In its broadest aspect, phosphate rock or like ores are converted into elemental phosphorus by contacting the phosphatic materials, mixed with a reducing gas, in a vertical symmetrical flame. The flame and products of the reduction reaction are allowed to fall freely through the vertical reactor, which in a preferred embodiment, is maintained at a nearly constant uniform temperature. Molten reaction products are collected at the bottom of the reactor and the gaseous products containing the elemental phosphorus are withdrawn for further processing to recover the pure phosphorus. In a preferred embodiment the hot gaseous reaction products are used to preheat the phosphatic feed materials.

A unique advantage of the present invention lies in the use of relatively low cost fuel or combustible gases in contrast to the electrical energy used in an electric furnace. However, in a further embodiment of the present invention, in order to maintain a high, uniform temperature throughout the reactor, the reducing flame may be augmented by electric resistance heating which provides a homogeneous, uniform temperature throughout the volume of the reactor. This is in contrast, as will be described in detail hereinafter, to the localized, low voltage, high amperage current used in an electric furnace.

Alternatively, the uniform temperature in the reactor may be obtained by the use of one or more oxy-fuel burners positioned throughout the length of the reactor, as required. The oxy-fuel burners may be used in lieu of the electrical augmentation or in addition thereto, etc.

It is accordingly a general object of this invention to provide a unique process for producing phosphorus from phosphate rock or other phosphatic materials not subject to the disadvantages of prior known processes.

Another and more particular object of this invention is to provide a highly efficient and economical method for producing elemental phosphorus employing flame reduction of phosphate rock or like ores.

Yet another object is to provide a method for producing phosphorus from phosphate rock employing relatively low cost energy obtained by burning fuels in oxygen-containing gases.

Still another object is to provide a continuous, economical method of producing phosphorus from phosphate rock employing flame reduction augmented by electrical energy.

The manner in which the foregoing and other objects are achieved in accordance with the present invention will be better understood in view of the following detailed description and accompanying drawings which form a part of the specification and wherein:

FIGURE 1 is a diagrammatic illustration, shown in elevation, of a suitable arrangement of apparatus for carrying out a first embodiment of the invention.

FIGURE 2 is a diagrammatic illustration, shown in elevation, of a suitable arrangement of apparatus for carrying out a second embodiment of the invention.

FIGURE 3 is a vertical section of a preferred means for sealing the lower portion of the reactor that may be used in carrying out the invention.

FIGURE 4 is a vertical section showing details of the upper portion of a reactor that may be used in the present invention.

Stated broadly, in accordance with the method of the present invention, finely divided phosphate rock and a reducing gas, preheated to a temperature of approximately 1700° F., are introduced to the top of a vertical reactor. In one advantageous embodiment of the invention the phosphate rock is fed to the reactor by an eductor, driven by approximately that amount of reducing gas required to reduce the phosphate rock to elemental phosphorous. After entering the top of the reactor, the rock and reducing gas contact a vertical symmetrical flame produced by the combustion of a fuel and oxygen containing gases. The gaseous reaction products and molten slag droplets produced during reduction of the phosphate rock in the flame, are allowed to fall freely through the vertical reactor which may have a series of electrodes for establishing an electrical discharge across the flame. As to be described in more detail hereinafter, the distributed discharge consists of a high voltage, low current discharge in contrast to the low voltage, high current discharge between the electrodes in an electric furnace. The temperature in the reactor is in the range of from 3000–4500° F. and assures substantially complete reduction of the phosphate rock. The reaction products issue from the bottom of the reactor into a slag separation zone wherein the slag is collected in a molten pool. The effluent gaseous products pass upward from the slag collection zone through a series of cyclones and one or more preheating units (for the phosphate rock) and, finally, to a phorphorus condenser wherein the elemental phosphorus is collected as a liquid. In one particularly advantageous embodiment of the present invention the hot effluent gases from the slag collection zone are passed upward through a dense bed of fluidized phosphate rock for preheating the rock. The product gases, containing phosphorus, carbon monoxide and water vapor, issue from the top of the fluidized bed preheater at approximately 1700° F. and pass through a cyclone, a wasteheat recovery unit, thence to a phosphorus condensing unit. In accordance with a second embodiment, the effluent gases from the slag collection zone are passed upward into a refractory oil quench system and next passed to a concurrent phosphate rock preheater. The preheated solids are separated from the product gases in a cyclone separator. The effluent gases, containing phosphorus, water vapor and carbon monoxide, are led to a waste heat boiler and next to a phosphorus condenser wherein liquid phosphorus is removed.

Turning now to the drawings in detail, and first to FIGURE 1, there is shown a suitable arrangement of apparatus for carrying out a first, particularly advantageous method embodiment of the invention. In FIGURE 1, solid feed material is introduced into the system through conduit 1 and into a fluidized bed preheater 2. The solid feed material comprises finely divided phosphate rock, or like ores, and is preferably ground such that 90% thereof passes a 200 mesh screen. The fluidized bed preheater 2 generally comprises a refractory lined shell 3 having suitable gas inlet and outlet conduits 4 and 5 respectively, a grate 6, and a solids overflow standpipe 7. The finely divided feed is preheated in the preheater 2 to a temperature of approximately 1700° F. by the hot gaseous reaction products issuing from the reactor 10 as described below. As shown in FIGURE 1, the solids overflow into the standpipe 7 are fed to the top of the reactor 10. In the embodiment of FIGURE 1, the solids are fed to the reactor by a suitable eductor 8 which is driven by the reducing gas to reduce the phosphate rock. In this manner the reducing gas and finely divided phosphate rock are thoroughly mixed prior to entering the reactor 10. The reducing gas is preferably a light hydrocarbon fuel gas which cracks at relatively low temperatures, i.e., natural gas (substantially methane) which begins to crack at approximately 700–800° F. Thus in the eductor type feed system of FIGURE 1, heat would be transferred from the finely divided preheated rock to the reducing gas and would effect partial cracking of the gas to carbon and hydrogen. The finely divided carbon would partially coat the finely divided rock particles thus serving to provide an additional and particularly advantageous reducing agent for the rock. As shown in FIGURE 1, the fuel gas is introduced into conduit 11 and is passed through a coil or heat exchange tube 12 in the fluidized bed preheater 2. The light hydrocarbon fuel gas may also be used for combustion with oxygen in the flame burners. As is known, however, other fuels, including liquid and solid fuels, e.g., kerosene, and ground coal could be used. In FIGURE 1, the fuel gas is fed to the eductor 8 through conduit or pipe 14 and to the burners at the top of the reactor 10 by way of conduit 15. The oxygen-containing gases, for combustion with the fuel gas, is introduced into the reactor by way of conduits 16 and 18. These gases may be preheated in coils 17 in the preheater 2. Suitable control and metering valves (not shown) may be positioned in the various conduits. In general, the fuel or reducing gas is fed to the eductor 8 in approximately the amount required to reduce the phosphatic feed material to phosphorus and/or oxides thereof.

In this regard it may be stated that under certain process conditions, and for reasons not understood, phosphorus oxides may be concurrently produced.

Upon entering the top of the reactor, the phosphate rock and reducing gas mixture directly contact a vertical symmetrical flame or flames, produced by combustion of the fuel gas with oxygen. While commercial tonnage oxygen containing 95% oxygen is preferably used, oxygen for the flame may come from any source containing oxygen. However the presence of non-reactive gases reduce the thermal efficiency of the system.

The flame temperature at top of the reactor is in the range of approximately 3000° F.–4500° F., which is sufficient to effect substantially complete reduction of the phosphatic materials.

While the chemistry involved in the reduction of phosphatic rock or like ores to phosphorus is complex, in general, the overall reaction can be represented by the following equation:

$$3Ca_3(PO_4)_2 + 5CH_4 \rightarrow 1\frac{1}{2}P_4 + 9CaO + 5CO + 10H_2O$$

The hot products of combustion including molten slag droplets (i.e., CaO and calcium silicates in varying amounts depending upon the grade of ore used etc.) and gaseous products, i.e., phosphorus, carbon monoxide, water vapor and fluorides (not shown in the simplified equation above), upon contacting the hot flame are allowed to fall freely through the reactor 10. Silica can be added to the reacting system to produce a slag that is predominately a calcium silicate slag. This product, with further processing, has a salable value and is thus preferred to the calcium oxide rich slag.

If there is sufficient silicates or if silica is added, the calcium silicate slag separates by gravity from the molten ferrophosphorus slag, also formed as a product. These materials may be tapped separately from the hearth 24 as shown in FIGURES 1–2, through taps 19 and 19'.

In general, the vertical reactor 10 may be constructed of known refractory materials, or may include a shell that is internally and externally coated with refractory materials, etc. As generally illustrated in FIGURE 4, the reactor may include external cooling jackets, generally represented at 20. As is known in the art, in the mechanical design of the reactor, allowance must be made for the expansion, particularly in length, of the reactor shell. Any suitable construction, to effect this purpose, may be employed. However, in this regard, it has been found to be particularly advantageous to support the reactor at the top end, with the bottom end free to expand. Suitable support rings or lugs (not shown) resting on a steel structure, etc., may be used to support the reactor at the top end. Turning now to FIGURE 3, the open, bottom end 21 of the reactor is positioned into the opening 22 in the roof 23 of the slag hearth 24. As shown in FIGURE 3, sealing is accomplished with an annular water seal, generally indicated at 25 when operating at near atmospheric pressures. Other suitable seals may, of course, be used in lieu thereof.

It may be briefly stated that, and as is known in the art, the slag hearth 24 may be of a suitable hollow brick construction which may be used e.g., to preheat the oxygen-containing gases etc.

As set forth above, the reactor is preferably maintained, at least in the upper portion thereof at a constant uniform temperature to effect complete reaction of the feed materials in their concurrent downflow through the reactor. The length of the reduction zone maintained at the uniform temperature will of course vary depending upon flame temperature, the specific chemical system, the rate of combustion and reaction, etc.

In this regard, it should here be noted that the instant invention affords many unique and distinct advantages over prior known methods as discussed above. Briefly, in contrast to the low temperature limitations of the hot gases in the fluidized bed processes, to prevent agglomeration of the fluent particles, in the present invention, an oxygen-fuel flame having a temperature in excess of 3000° F., is employed. The reaction thus takes place in the liquid rather than the solid phase of the rock. Therefore maximum initial conversion of the phosphate rock is effected in the zone at the top of the reactor wherein the phosphatic materials are first contacted with the flame. Thereafter substantially complete conversion of any unreacted ore is completed as the products are carried in the concurrent downflow through the reactor. Residence time to afford maximum conversion is merely a function of the height of the reactor, at a given through-put rate of the reactants.

While the energy required to obtain optimum conversion of the phosphatic materials into phosphorus or oxides thereof, may come from the reducing flame alone, in a particularly advantageous embodiment of the invention, as discussed above, the oxy-fuel flame may be augmented with electrical energy. In general such augmentation is effected by superimposing an electrical discharge on the flame to further heat the products of combustion as described in U.S. Patent 3,004,137 to Karlovitz, which issued Oct. 10, 1961. Stated briefly, this patent discloses a method of producing a stream of high temperature gas wherein an electrical discharge is established across a flame formed by the chemical combustion of an air or oxygen-fuel mixture. As set forth, in col. 1, lines 28–59 of the patent, the "distributed" discharge consists of a high voltage, low current discharge which supplies heating current flowing through the entire flame volume. This is a separate and distinct thing from arcs which are low voltage, high current discharges, concentrated between two electrodes.

The addition of the electrical energy to the flame, in accordance with the technique described by the patent to Karlovitz, elevates it to a level ranging from between the high operating temperature of an electric arc, on the one hand, and the oxy-fuel flame on the other.

In this regard and turning now to FIGURE 4, there is shown a fuel burner, generally indicated at 30. As shown in FIGURES 1–2, a plurality of burners may be provided to reduce the size thereof and to cover the entire area of the reactor, etc. Commercial oxygen, or other oxygen source, is fed into the burner 30 by way of conduit 18. Fuel gas, e.g., methane, other light hydrocarbon gases, etc., is introduced via conduit 15. The fuel gas contains small, metered quantities of ionizable salts which are ionized in the combustion flame and which enable the combustion gases to conduct an electric current. Water cooled electrodes 31 and 32 are positioned within the burner 30 to strike an arc in the gas steam to complete ionization of the salt additive.

Electrode pairs, 35–35' and 36–36' illustrated diagrammatically in FIGURES 2 and 4, are used for creating the distributed electrical discharge across the flame, in accordance with the teaching of aforementioned U.S. Patent 3,004,137. The electrodes are connected to a suitable power source 39 by way of leads 37 and 38, as shown in FIGURE 2. Any suitable number and types, e.g., ring electrodes, may be positioned at varying points along the length of the reactor, for various size reactors, process conditions, etc.

Also, and in locations wherein the cost of electrical energy is particularly high, the vertical flame at the top of the column may be augmented by a series of secondary flame burners (not shown) which may be positioned along the length of reactor, as required. In this regard, e.g., while reduction of the phosphatic ores may be as high as 90–95% in the upper portion of the reactor with the use of only the vertical flame, a pluarlity of ring burners positioned near the bottom of the reactor may insure nearly complete conversion.

Referring again to FIGURE 1, the hot gases of combustion and molten slag droplets are swept downwardly through the reactor and the slag is separated and collected in the slag hearth 24. The slag products are tapped at 19 and 19' as discussed above. The gaseous products pass upward from the hearth via conduit 41 and into a slag cyclone 42 to remove any slag droplets which might have been entrained in the gases. The effluent gases from the cyclone are passed upward from the cyclone and into the fluidized bed preheater 2 via conduit 4. While the fluidized bed preheater has been described above, it should be noted that the temperature in the fluidized bed should not exceed 2500° F. since phosphate rock and like ores fuse at approximately this temperature. Thus, inasmuch as the gases issue from bottom of the reactor at a temperature in the range of from 3000 to 4500° F., depending upon operating conditions, height of reactor, use of electrical augmentation, etc., the fluidized bed or inlet conduits may have to include external cooling means, etc.

The product gases containing phosphorus, carbon monoxide and water vapor, issue from the top of the fluidized bed preheater at approximately 1700° F. and pass through a cyclone 43 for separation of any entrained solids. From the cyclone, the hot gases pass to a conventional waste recovery unit i.e., a waste heat boiler, indicated generally at 44 for recovery of energy.

In this regard, however, in lieu of the conventional waste heat boilers, etc., the waste heat recovery unit may consist of a second fluidized bed (not shown) wherein, e.g., the phosphatic feed materials are preheated in two stages, etc.

In passing through the waste heat recovery unit, the process gases are reduced to a temperature in the range of approximately 600–700° F. This temperature is sufficiently high to prevent condensation of phosphorus and volatile phosphorus oxides. The gases are next fed to a phosphorus condensation system, indicated generally at 45, wherein liquid phosphorus is recovered. In general, the phosphorus condenser may be of any conventionally known type, including the direct water spray cooled system, such as described e.g., in U.S. Patent 3,148,042 to Harnisch et al., which issued Sept. 8, 1964. The condensed phosphorus, at a temperature of about 170° F., may be collected in a heated, water filled sump not shown) and pumped to a phosphorus storage tank system, etc. The waste gases, now consisting almost exclusively of carbon oxides, but containing some water vapor and a small amount of phosphorus, are conveyed through rotary blowers or compressors indicated generally at 46, to a waste gas flare or for possible use as an in-process fuel, etc.

Turning now to FIGURE 2, there is shown a second particularly advantageous embodiment of the present invention. In this embodiment, the effluent hot gases reaction products issuing from the slag cyclone, as described above, are passed upward into an oil quench tank 50 wherein the gases are cooled to approximately 2500° F. The oil in the quench tank is preferably a refractory aromatic oil such as used, e.g., in the quenching of acetylene reaction gases, and may be passed through a centrifuge 51 for removal of solids and returned to the quench tank. Make up oil may be added as required. From the quench tank the partially cooled gases pass through a cyclone 52 for removable of entrained oil droplets, etc. From the cyclone, the gases pass through conduit 53 and, as shown in FIGURE 2, are used to pneumatically convey the ground phosphate rock feed introduced at the bottom of the vertical riser pipe 54. In this manner, the hot effluent gases are utilized in a concurrent heat exchange to preheat the ground rock feed from ambient temperatures to about 1700° F. In this regard, it should again be noted that phosphate rock will fuse at about 2500° F. Therefore, the temperature of effluent gases must be controlled to assure that the particles of rock, in admixture with the hot gases, do not fuse. Suitable temperature control means (not shown) operatively associated with the oil quench system, to effect this purpose, may be used.

The reaction gases, carrying the now pre-heated rock feed enter into a cyclone separation system comprising primary and secondary cyclones 55 and 56 respectively. In the primary cyclone 55, the solids are separated from the hot gases and fall by gravity into a feed conveyor 57 for introducing the preheated, finely divided charge into the reaction zone. The effluent gases from the primary cyclone pass upward into the secondary cyclone 56 for removal of any entrained solids. The product gases issue from the top of the cyclone 56 and are fed through a waste heater boiler and then to a phosphorus condensation system, as described above.

The following examples serve to illustrate the present invention but are not intended to limit it thereto.

Example 1

In this example, the equipment used is substantially as shown in FIGURE 1. The dimension of the primary reactor is approximately 2'6" I.D. by 100' in height. The reactor shell is constructed of carbon steel, lined with a 6" thickness of a castable silica refractory. The steel reactor is jacketed to accomplish cooling.

Phosphate rock ground to approximately 200 mesh, to facilitate heat and mass transfer in the reactor, is continuously fed to the fluidized preheater at a rate of approximately 28 tons/hour. In initial start-up operations, the solids are fluidized by preheated reducing gas. The finely divided phosphate rock and reducing gas admixture are introduced to the top of the reactor and in direct contact with a reducing flame produced by the combustion of natural gas with commercial tonnage oxygen containing 95% oxygen. The temperature of the flame at the top of the reactor is approximately 4000° F. In this run, no electrical augmentation of the flame is employed. Six burners are used. Fuel in the burners is natural gas. The oxygen source is 95% commercial tonnage oxygen.

The flame and combustion products are swept through the reactor and the molten slag droplets collected in a slag hearth positioned beneath the reactor. The effluent gases, at a temperature of approximately 3200° F. issuing from the top of the slag hearth are passed through a conventional cyclone. The effluent gases from the cyclone are introduced into the bottom of a fluidized bed preheater. The dimensions of the preheater are 14' I.D. by 36' in height. In the preheater, and after reaching a steady-state or equilibrium in the system, the finely divided phosphate rock is heated from ambient temperature to approximately 1700° F. The reaction product gases, in passing through the fluidized bed are reduced in temperature to approximately 1600° F. The slight temperature difference in the rock particles and effluent gases results from heat given up in heating oxygen and the fuel gases which are passed through heat exchange coils in the upper portion of the preheater. The effluent gases from the preheater are passed through a cyclone to remove entrained fines or solids and are then passed through a conventional waste heat boiler. The product gases, exiting the waste heat boiler at approximately 700° F. are passed to a direct water spray phosphorus condenser whereby the vaporous phosphorus in the product gases is condensed. The condensed phosphorus, at a temperature of approximately 170° F. is collected in a steam coil heated, water filled sump, maintained at 170° F. The phosphorus in the sump is pumped through submerged pumps to a phosphorus storage tank system. The waste gases from the phosphorus condenser are conveyed through a rotary compressor to a stack where they are burned in a waste gas flare.

In this run, using direct flame reduction only, and a 100' reactor, as indicated above, approximately 88% conversion of the phosphate rock feed to phosphorus is obtained.

Example 2

The procedure of Example 1 is repeated except that a series of ring burners are employed to maintain a substantially uniform temperature throughout the reactor. The flame temperature at the top of the column is 4000° F. and the product gases issue from the lower portion of the reactor at 3900° F. Four burners, positioned at (from the bottom of the reactor) 15', 25', 35', and 45', are employed. The fuel and oxygen source in the ring burners are the same as in the main burners.

Example 3

The procedure of Example 1 is repeated except that natural gas, burned in 95% oxygen supplied 90% of the total energy required and the imposition of an electric current on the hot conducting gas flame supplies the remaining 10%.

The voltage required to supply the electrical power is 1200 volts. The current through the flame is 25 amperes. Through the use of only 12% electrical augmentation a nearly constant uniform temperature of approximately 3900° F. through the first (from the top) 50' of the reactor is maintained.

While particularly advantageous embodiments of the invention have been described and illustrated by the examples, it will be recognized by those skilled in the art that various changes and modifications can be made therein without departing from the scope of the invention as defined by the appended claims.

What is claimed is:

1. A process for preparing phosphorus which comprises:
   (a) maintaining a reducing flame by the combustion of a fuel selected from the group consisting of hydrocarbons and coal and oxygen having a temperature of at least 3000° F.;
   (b) passing a mixture of finely divided phosphate ore and a reducing reactant selected from the group consisting of hydrocarbons and carbon into contact with said flame to produce a reaction mixture which contains vaporized phosphorus; and
   (c) recovering said phosphorus from said reaction mixture.

2. The process of claim 1 wherein said mixture of phosphate ore and reducing component are subjected to a plurality of flames to effect substantially complete conversion of the phosphate values of said phosphate ore to phosphorus.

3. The method of claim 1 wherein said phosphate ore-reducing reactant mixture is preheated to a temperature of 1700 to 2000° F.

4. The method of claim 1 wherein said flame is maintained at said temperature by establishing an electrical discharge across said flame.

5. The method of claim 4 wherein at least 90% of the total energy required for conversion of the phosphate ore into phosphorus is obtained by combustion of fuel with oxygen.

6. The method of claim 1 wherein slag containing calcium and siliceous oxides produced during the reaction is separated from said reaction mixture prior to recovery of said phosphorus.

References Cited

UNITED STATES PATENTS

| | | | |
|---|---|---|---|
| 2,155,119 | 4/1939 | Ebner | 23—1 |
| 3,004,137 | 10/1961 | Karlovitz | 219—75 |
| 3,341,289 | 9/1967 | Hendrickson | 23—165 |

FOREIGN PATENTS 1,004,382  9/1965  Great Britain.

OSCAR R. VERTIZ, Primary Examiner

S. B. SHEAR, Assistant Examiner

U.S. Cl. X.R.

23—165